United States Patent [19]
Hochstein

[11] Patent Number: 5,633,629
[45] Date of Patent: May 27, 1997

[54] TRAFFIC INFORMATION SYSTEM USING LIGHT EMITTING DIODES

[76] Inventor: Peter A. Hochstein, 2966 River Valley Dr., Troy, Mich. 48098

[21] Appl. No.: 386,816

[22] Filed: Feb. 8, 1995

[51] Int. Cl.$^6$ .................................................. G08G 1/095
[52] U.S. Cl. ..................... 340/907; 340/901; 340/905; 340/916; 359/154; 359/157; 359/109; 362/800
[58] Field of Search ....................... 340/901, 905, 340/906, 907, 909, 916, 924; 359/154, 157, 109; 362/800

[56] References Cited

U.S. PATENT DOCUMENTS

| | | | |
|---|---|---|---|
| Re. 21,818 | 6/1941 | Halstead | 340/905 |
| 1,808,022 | 2/1931 | Del-Prete | 246/30 |
| 1,978,286 | 10/1934 | Sommer | 455/41 |
| 2,442,851 | 6/1948 | Halstead | 340/905 |
| 3,509,525 | 4/1970 | Levine et al. | 340/932 |
| 3,629,600 | 12/1971 | Stuler et al. | 307/66 |
| 3,764,844 | 10/1973 | Schmidt | 313/220 |
| 4,128,789 | 12/1978 | Owen | 315/209 R |
| 4,437,039 | 3/1984 | Larson | 315/60 |
| 4,729,076 | 3/1988 | Masami et al. | 362/235 |
| 4,745,323 | 5/1988 | Northrop et al. | 313/25 |
| 4,757,236 | 7/1988 | Dakin et al. | 313/638 |
| 4,772,819 | 9/1988 | Ridders | 313/493 |
| 4,921,468 | 5/1990 | Miwa | 340/905 |
| 4,939,426 | 7/1990 | Menard et al. | 315/192 |
| 4,951,179 | 8/1990 | Machida | 362/61 |
| 4,954,931 | 9/1990 | Hassler, Jr. | 362/32 |
| 4,959,584 | 9/1990 | Anderson | 313/160 |
| 4,992,704 | 2/1991 | Stinson | 315/312 |
| 5,010,336 | 4/1991 | Mosele et al. | 340/907 |
| 5,036,248 | 7/1991 | McEwan et al. | 313/500 |
| 5,132,682 | 7/1992 | Higgins et al. | 340/931 |
| 5,136,287 | 8/1992 | Borenstein | 340/925 |
| 5,151,630 | 9/1992 | Boy et al. | 313/602 |
| 5,160,200 | 11/1992 | Cheselske | 362/249 |
| 5,160,201 | 11/1992 | Wrobel | 362/249 |
| 5,172,113 | 12/1992 | Hamer | 340/907 |
| 5,175,528 | 12/1992 | Choi et al. | 340/331 |
| 5,187,476 | 2/1993 | Hamer | 340/906 |
| 5,208,584 | 5/1993 | Kaye et al. | 340/907 |
| 5,317,307 | 5/1994 | Thomas, Jr. | 340/815.45 |
| 5,444,742 | 8/1995 | Grabow et al. | 340/905 |

*Primary Examiner*—Jeffery Hofsass
*Assistant Examiner*—Daryl C. Pope
*Attorney, Agent, or Firm*—Howard & Howard

[57] ABSTRACT

A traffic information system (10) including a road (12), a vehicle (14) traveling on the road (12) and a traffic light assembly (16) operatively associated with the road (12) is disclosed. The system (10) includes a traffic light assembly (16) comprising at least one traffic light or lamp means (18). The traffic light (18) includes a plurality of light emitting diodes (24) for projecting light rays to the vehicle (14) to provide the driver of the vehicle (14) with a visual signal. The system (10) further comprises a transmitter (20) including a power supply (30) and a modulator (72) for turning the diodes (24) on and off at a rate that is imperceivable to humans while optically transmitting information to a receiver (22) disposed on the vehicle (14).

73 Claims, 5 Drawing Sheets

F.S.K. MODULATION OF L.E.D. TRAFFIC LIGHT
SHOWING AVERAGE CONSTANT DUTY CYCLE

TRAFFIC INFORMATION SYSTEM USING LIGHT EMITTING DIODES

TECHNICAL FIELD

The subject invention relates to a traffic information system of the type including a traffic light that provides an illuminated signal for transmitting information to a remotely located target.

BACKGROUND ART

Traffic lights have been used since the early 1900's to control vehicular traffic flow by advising drivers when and where to stop, proceed, turn, etc. The growing use of traffic lights attests to their effectiveness in directing traffic flow, reducing the incidence of accidents, and most recently to their utility in controlling the flow of traffic through large metropolitan areas when used in conjunction with computer driven systems.

Interestingly, the modern traffic light is no different today than it was decades ago. The basic light still employs red, yellow, and green filters over incandescent lamps that are sequentially turned on and off by an electromechanical timing switch or by more modern solid state traffic controllers. Recent developments in solid state lamps, i.e. light emitting diodes (L.E.D.) have permitted the replacement of the conventional incandescent-based traffic lights with L.E.D.-based traffic lights. Examples of L.E.D.-based traffic lights can be found in U.S. Pat. Nos. 4,729,076 and 5,136,287. The main advantages of L.E.D.-based traffic lights over an incandescent-based traffic lights are much lower power usage, i.e. higher luminous efficiency, and much longer lamp life. Other than luminous efficiency and lamp life, other important properties of light emitting diodes have not yet been utilized in traffic control systems. The present invention incorporates improvements in traffic light technology made possible by the use of light emitting diodes.

SUMMARY OF THE INVENTION AND ADVANTAGES

The present invention is a traffic information system for providing a visual signal in the form of light rays and for using the light rays to transmit information. The system comprises a traffic light including a plurality of light emitting diodes for projecting light rays and a power supply for supplying power to illuminate the diodes at a predetermined frequency having a duty cycle consisting of an ON period followed by an OFF period short enough to be humanly imperceivable. The present invention is characterized by a modulator for varying the frequency of the ON and OFF periods to transmit information.

The primary advantage of the present invention is the provision of a traffic information system that utilizes the light emitted from a traffic light to optically transmit information to the driver of a vehicle.

Another advantage of the present invention is the provision of a traffic light retrofit comprising a plurality of light emitting diodes which can be used to replace incandescent-based traffic lights to thereby cut energy and maintenance costs.

Another advantage of the present invention is the provision of a L.E.D.-based traffic light having a battery back-up for providing emergency power.

Another advantage of the present invention is a traffic light system that utilizes the light emitted from a traffic light to remotely detect and distinguish a "red", "yellow", or "green" light.

DETAILED DESCRIPTION OF THE PREFERRED EMBODIMENT

Figure 1:
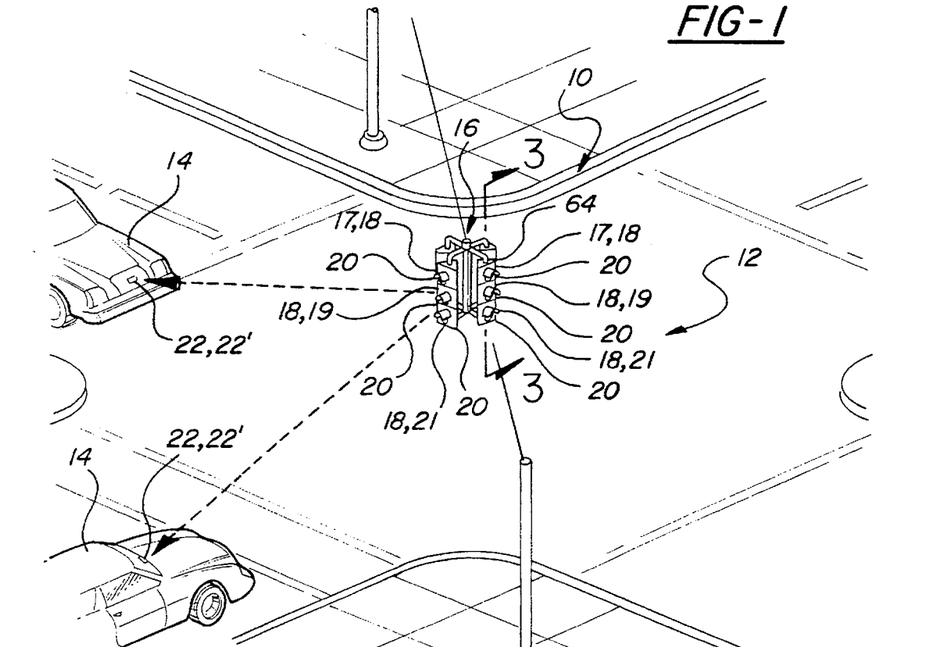
FIG. 1 is a perspective view of the traffic control system of the present invention.

Referring to FIG. 1, the traffic information system 10 of the present invention is shown. The traffic information system 10 includes a road 12, a target such as a vehicle traveling on the road 12 and a traffic light assembly 16 operatively associated with the road 12. The traffic light assembly 16 comprises at least one traffic light or lamp means 18 for providing an illuminated signal. Typically, the traffic light assembly 16 includes red, yellow and green traffic lights 17, 19, 21 for projecting red, yellow and green light rays to signal the driver of the vehicle 14 to "stop", "yield", or "go", respectively. However, it is to be understood that while an intersection control light is depicted in FIG. 1, the benefits of this invention may be applied to a variety of other applications such as pedestrian crossing signals, e.g. WALK, DON'T WALK signals or any other illuminated "traffic related" message for controlling traffic or simply providing information.

Figure 2:
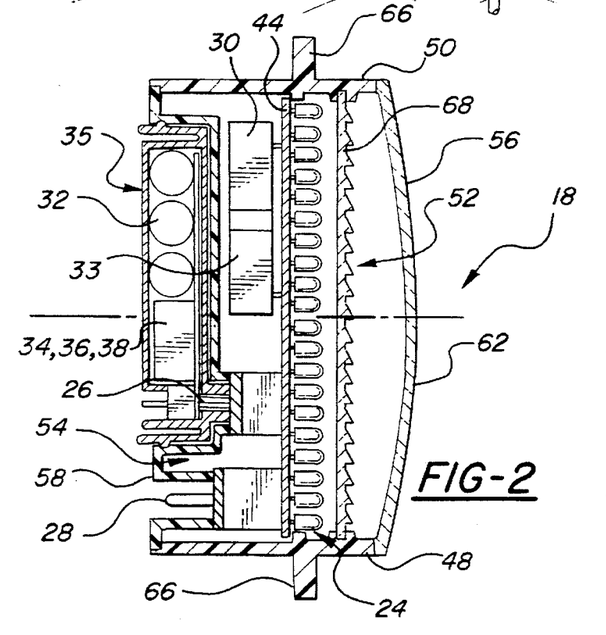
FIG. 2 is a cross sectional view of the traffic light retrofit of the present invention.
Figure 3:
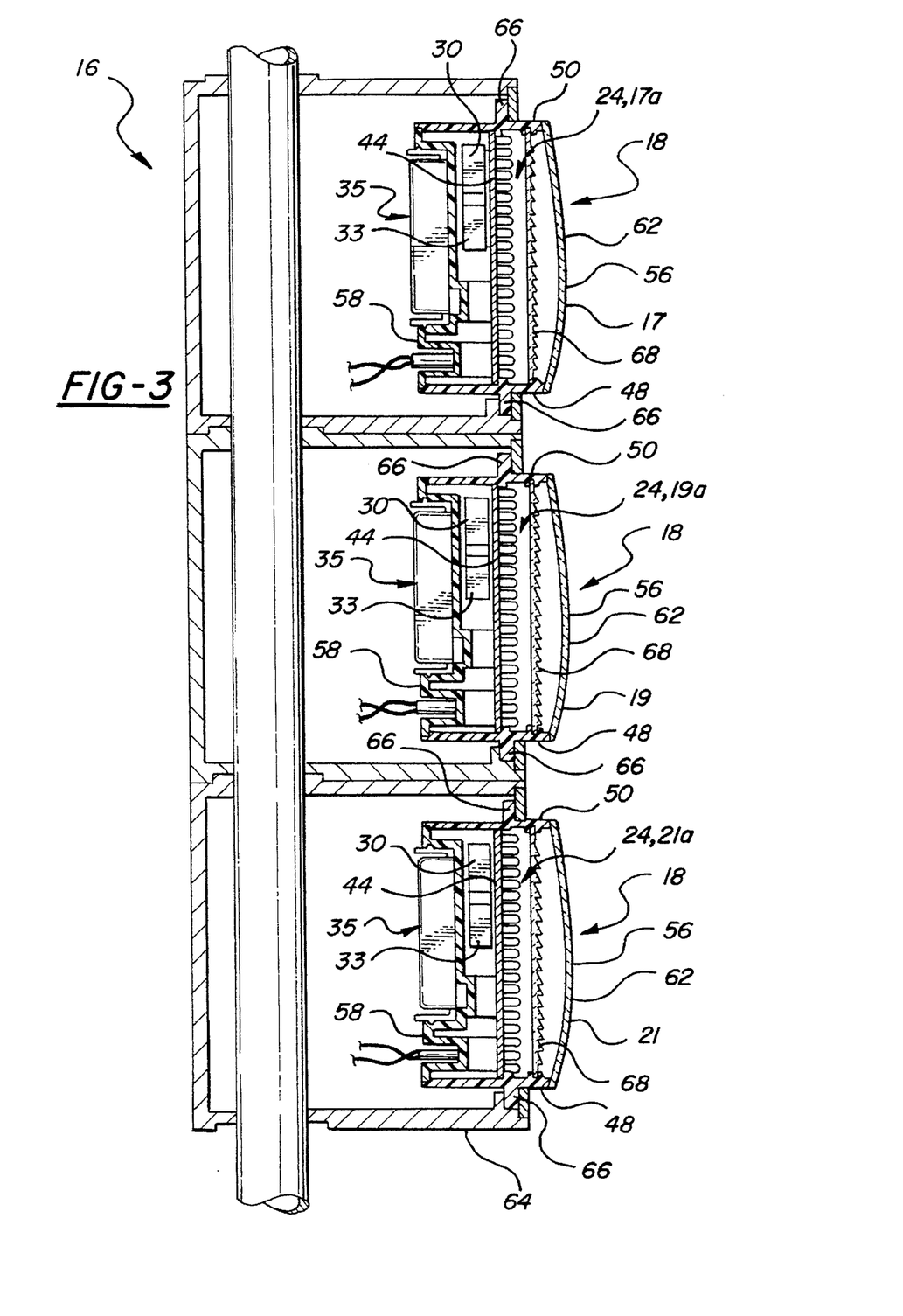
FIG. 3 is a cross sectional view of the traffic light assembly taken about line 3—3 of FIG.

As shown in FIGS. 2 and 3, the preferred embodiment of each traffic light or lamp means 18 includes a plurality of light emitting diodes 24 for transmitting light rays from the traffic light assembly 16. In other words, the red traffic light 17 comprises a first set of light emitting diodes 17A for projecting red light rays, the yellow traffic light 19 comprises a second set of light emitting diodes 19A for projecting yellow light rays, and the green traffic light 21 comprises a third set of light emitting diodes 21A for projecting green light rays. Each traffic light 18 further includes d.c. power connection means 26 secured to the traffic light 18 and electrically coupled to the diodes 24 for receiving d.c. power. The traffic light assembly 16 also includes a.c. power connection means 28 secured to the traffic light 18 for receiving a.c. power. The traffic light assembly 16 further includes d.c. power supply means 30 secured to each traffic light 18.

Figure 4:
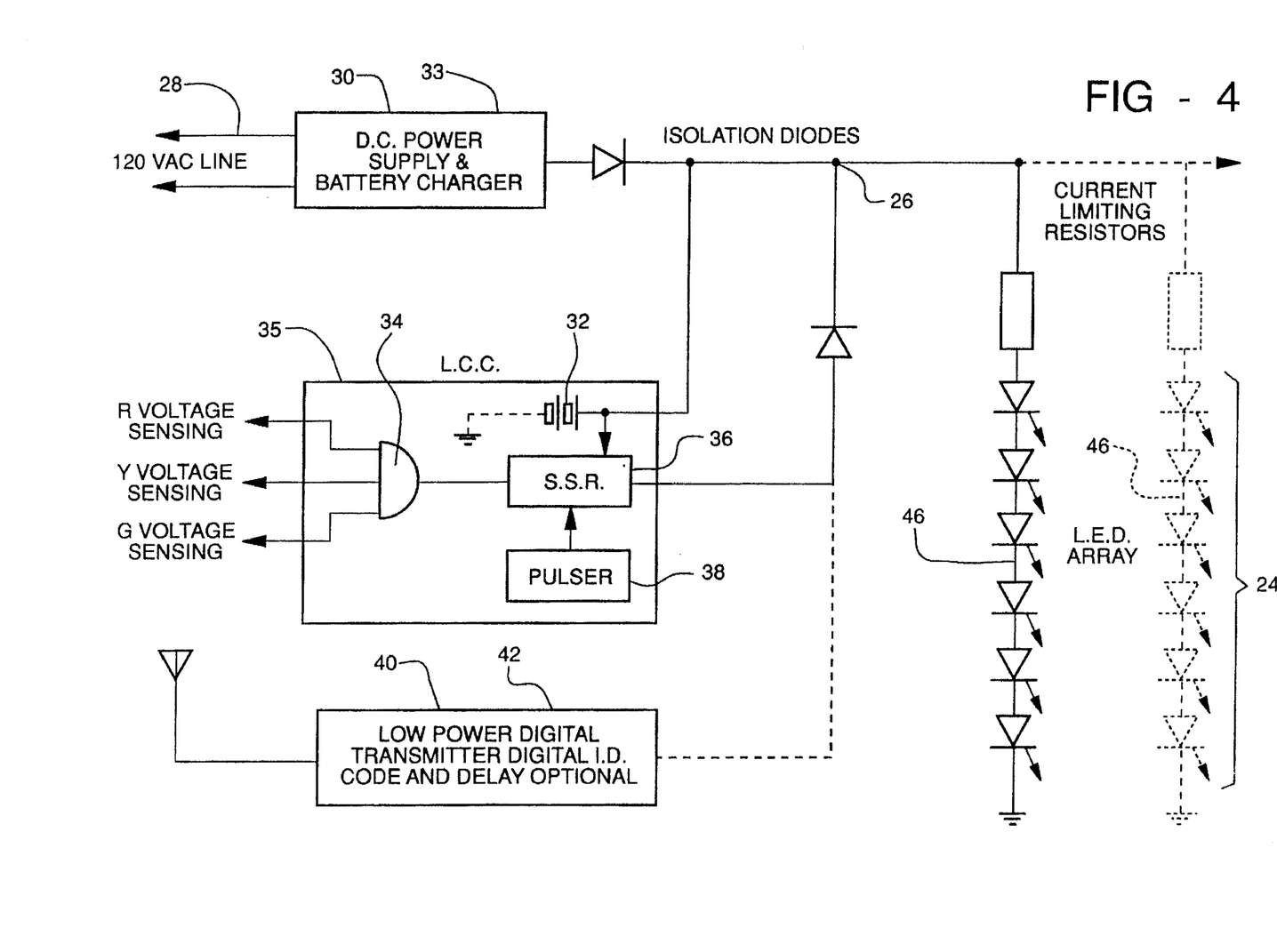
FIG. 4 is a schematic block diagram of the electronic circuitry utilized in the present invention.

Referring to FIG. 4, d.c. power supply means 30 is electrically coupled to and between the a.c. power connection means 28 and the d.c. power connection means 26 for converting a.c. power received by the a.c. power connection means 28 to d.c. power so that d.c. power is supplied to said d.c. power connection means 26. A d.c power supply means 30 may be of conventional linear or switchmode design. The d.c. power supply means 30 includes a step-down transformer to bring the a.c. line voltages of 120–140 volts down to approximately 13.5 volts and a standard full or half wave rectifier to convert the a.c power to d.c. power.

The traffic light assembly 16 is characterized by a battery 32 removably connected to the traffic light 18 for supplying d.c. power to said d.c. power connection means 26 to illuminate the diodes 24. Preferably, the battery 32 is rechargeable. For example, battery 32 could include any sealed lead—acid, nickel—metal hydride, or lithium rechargeable batteries. The traffic light assembly 16 further comprises battery charger means 33 secured to the traffic light 18 and electrically coupled to and between the a.c. power connection means 28 and the d.c. power connection means 26 for recharging the battery 32.

The interconnection of the backup battery 32 with the traffic light 18 is shown in FIG. 4, and essentially provides for a parallel power source with the d.c. power supply means 30. Ordinarily, the output voltage of d.c. power supply means 30 would be the same as the rated operating voltage of the traffic light 18 and the nominal voltage of the battery 32. That is, if the traffic light 18 were designed to operate at 12 Volts, then the battery 32 would also have a 12 Volt output and would be charged at a comparable (slightly higher) voltage from battery charger 33. The battery 32 does not supply power to the traffic light 18 until a power failure, i.e. until a.c. power from utility lines is no longer being supplied to a.c. power connection means 28.

Whenever a.c. utility power fails, the entire function of the standard traffic controller is compromised in addition to failure of the traffic lights themselves. Unless a central uninterruptible power supply is used to power both the traffic lights and the controller, the lights may not be operated because the critical timing function and sequencing normally provided by the controller is not available. Therefore, a specific aspect of this invention is to provide a safety default condition whereby all the red stop lights at an intersection are flashed whenever a.c. utility power fails. The default condition effectively establishes a four-way stop under battery power.

To implement the four-way stop default condition, traffic light assembly 16 further comprises a.c. power monitoring circuit means 34 secured to each traffic light 18 for monitoring a.c. power supplied to the a.c. power connection means 28. A.c. power monitoring circuit means 34 is preferably included as part of a power pack 35 which also includes battery 32. The power pack 35 may be attached to each traffic light 18 by various means. Monitoring means 34 monitors the lamp current at all the traffic lights (red 17, green 19 and yellow 21) of the traffic light assembly 16. The traffic light assembly 16 further comprises switch means 36 secured to each traffic light 18 for electrically coupling the battery 32 to the d.c. power connection means 26 in response to a trigger signal from the a.c. power monitoring means 34 prompted by a predetermined decrease in a.c. power supplied to the a.c. power connection means 28. The traffic light assembly 16 further comprises pulsating circuit means 38 secured to each traffic light 18 and electrically coupled to the switch means 36 for causing the switch means 36 to electrically couple the battery 32 to the d.c. power connection means 26 at a predetermined frequency to illuminate the diodes 24 at the predetermined frequency. Preferably, the pulsating means 38 is included as an integral part of the power pack 35. If monitoring means 34 detects a loss of power to all traffic lights 18 of traffic light assembly 16, switch means 36 connects the battery 32 to traffic light 18 and pulsating means 38 causes traffic light 18 to flash at the predetermined frequency. Preferably, only the red traffic light 17 is connected to the battery 32 upon a power loss so as to create the default flashing red condition. A typical flash duty cycle of 30% will extend the battery 32 life cycle to approximately 12 hours for a 24 Watt/Hr rated battery 32. Thus, the present invention allows low cost, autonomous, rechargeable battery packs to be adapted to L.E.D.—based traffic lamps in order to provide low cost emergency operation when line power outages occur, and to recharge automatically upon resumption of utility power. Although not described, the present invention may include creating a flashing yellow default or any other color combination instead of the red light default.

A small, low power radio transmitter 40 may be secured to the traffic light 18 to advise a central traffic engineering office of power outages or other problems. The radio transmitter 40 is electrically coupled to the switch means 36 for transmitting a radio wave in response to the trigger signal sent by monitoring means 34. As shown in FIG. 3, a digitally encoded radio transmitter 40 can be used to identify the location of the malfunctioning traffic light assembly 16. Alternatively, a cable modem could be used to relay this information. The traffic light assembly 16 may include delay means 42 secured to the traffic light 18 and electrically coupled to the radio transmitter 40 for delaying the transmission of the emitted radio wave a predetermined time after the switch means 36 receives the trigger signal. This delay is needed so that one radio frequency may be utilized by a number of traffic light assemblies without radio frequency collision by any two traffic light assemblies.

In the most simple configuration, all the diodes 24 can be arranged on a disk, plate or printed circuit substrate so that all of the diodes 24 are oriented in the same direction. Preferably, the diodes 24 are mounted on circuit board means 44. Circuit board means 44 comprises of a planar printed circuit board which includes connection means for electrically coupling the diodes 24 in a plurality of series circuits 46 and for electrically coupling the series circuits 46 in parallel. Each series circuit 46 includes an equal number of light emitting diodes 24.

Each traffic light 18 further comprises a traffic light housing 48. The light housing 48 comprises a hollow member 50 having a front open end 52 and a rear open end 54. The light housing 48 further comprises a front cover 56 for covering the front end 52 and a rear cover 58 for covering the rear end 54. The diodes 24 are mounted within the hollow member 50 between the front and rear covers 56, 58. The front cover 56 comprises a transparent glass or plastic material having a smooth outer surface 62. Transparent glass is necessary to allow light rays emitted by the diodes 24 to exit virtually unimpeded and smooth surface 62 is preferred to avoid accumulation of dust and dirt. The front and rear covers 56, 58 form a hermetic seal with the hollow member 50. The traffic control system 10 further comprises an assembly housing 64 for housing each traffic light 18. Each traffic light 18 further includes mounting means 66 for removably mounting each traffic light 18 to the assembly housing 64.

Figure 2A:
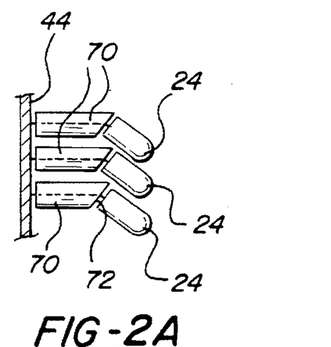
FIG. 2A depicts another aspect of the present invention.

The traffic light 18 may be retrofitted to permit the use of the light in existing traffic light assembly housings currently used to house incandescent traffic lights. Existing traffic signal lenses do not work satisfactorily with L.E.D.'s as these lens elements are ordinarily designed to operate in conjunction with a reflector and the quasi point source of a filament lamp. A more effective lens is needed to "fill-in" or illuminate the spaces between diodes 24 and to steer the light rays emitted from the diodes 24 to the intended target, such as the vehicle 14, to avoid wasting any light energy. To this end, each traffic light 18 may include one or more refractive elements 68 positioned between the diodes 24 and the front cover 56, or as part of the front cover 56. Refractive elements 68 act as a light ray steering means to steer the light rays emitted by the diodes 24 to the intended target. Alternatively or in addition to refractive elements 68, a spacer member 70 positioned between the circuit board means 44 and the diodes 24 can be used to point the diodes 24 in a particular direction. The spacer member 70 includes an angled surface 72 against which the diodes 24 abut to physically angle the diodes 24 relative to the road surface 12. Alternatively, the diodes 24 may be physically bent at their mounting leads to effect the desired angle with the circuit board means 44.

Another aspect of this invention relates to the ability of L.E.D. lamps to be pulsed at high rates; i.e. to be turned on (illuminated) and off (not illuminated) at high rates. By pulsing L.E.D.'s at high rates, data can be optically transmitted from the traffic light 18 to a remotely located photodetector. Thus, the diodes 24 can be used to transmit information to vehicle 14 such as announcing the presence of a traffic light and transmitting map coordinates, street names, directions or even traffic advisories. Existing incandescent traffic lights cannot be used to transmit digital data because the thermal inertia of the filaments in these lamps precludes the rapid modulation of the supply current to obtain detectable changes in light output. Obviously, slow on—off modulation of these lamps would be impractical as it would be annoying and confusing to drivers. The perceived luminosity of L.E.D. sources is a function of the average current that powers the L.E.D. For example, a d.c. value of 20 mA might yield roughly the same perceived luminosity from a L.E.D. as a square wave (50% duty cycle) of 40 mA peak current. The actual modulation of L.E.D. traffic lamps is rather simple, except for the fact that the perceived luminosity of the lamps needs to be essentially constant, as their main function is to visually alert drivers. Message transmission is a secondary function that must not interfere with normal use. If the perceived luminosity of each traffic light is to remain constant during operation, the average current delivered to the respective diodes must be essentially constant for periods greater than approximately 30 milliseconds. This period corresponds to a flicker frequency of about 33 Hz, which is perceptible by some humans.

Pulsing the diodes 24 of the traffic light 18 allows the remote detection of the light rays illuminated thereby as well as the identification of the light rays, i.e., whether the red, yellow, or green traffic light 17, 19, 21 is on. To distinguish whether either the red, yellow, or green traffic light 17, 19, 21 is illuminated, system 10 comprises a transmitter 20 including means for optically transmitting data from one of the traffic lights 18 of assembly 16 by turning the first, second, and third set of diodes 17A, 19A, 21A on and off at three distinct frequencies. For example, the first set of light emitting diodes 17A of the red traffic light 17 can be illuminated at 50 Khz, the second set of light emitting diodes 19A of the yellow traffic light 19 at 65 Khz, the third set of light emitting diodes 21A of the green traffic light 21 at 90 Khz. In this manner, the traffic lights 17, 19, 21, continue to serve their primary function of visually alerting drivers to stop, yield, or go while allowing the remote detection and identification of the lights.

The system 10 further comprises receiver means 22 located at a location remote from the traffic light assembly 16. For example, the receiver means 22 can be disposed on the vehicle 14, as shown in FIG. 1, for optically receiving the data transmitted by the transmitter 20. The receiver means 22 further includes photo-detector means for converting the light rays emitted by the red, green, and yellow traffic lights into first, second and third output signals of electric current having first, second and third output frequencies, respectively. The receiver 22 further includes differential means for differentiating the first, second and third output frequencies from each other to determine whether the red, yellow or green traffic light is illuminated. The receiver 22 can be battery powered, or powered by the electrical system of the vehicle 14.

Within the scope of the present invention and in addition to simple red, yellow and green light detection, the system 10 may include digital data transmission capability from the traffic light 18 to the vehicle 14. One or all colors (red, yellow, green and any turn signals, pedestrian messages, etc.) could be driven by a digital code generator to relay a message to oncoming vehicles, other traffic lights, or a central traffic center. Typically, each traffic light (red 17, yellow 19, and green 21) is "on" exclusively for a certain time, therefore all traffic lights 17, 19, 21 facing one direction could share the same message generator which would then transmit the same digital code for each color change. Alternatively, each individual traffic light 18 could be coded with a "color" precursor code to permit more sophisticated decoding schemes at the remote receivers 22. The data rate should be sufficiently high as to enable limited digital message transmission within a single flash of a flashing red or yellow traffic light 17, 19 in order to accommodate virtually all traffic signal contingencies. The most appropriate use for such traffic light message transmission capability would be audible routing directions. For example, upon approaching a given intersection, the vehicle mounted receiver 22 might announce, "Eastbound Metro Parkway at Hayes". No directional ambiguity exists because the message is only directed at oncoming traffic. Obviously, the transmitter 20 would have to be programmed to deliver the correct message, but this need be done only once, as the light remains at the same location for many years.

Figure 6:
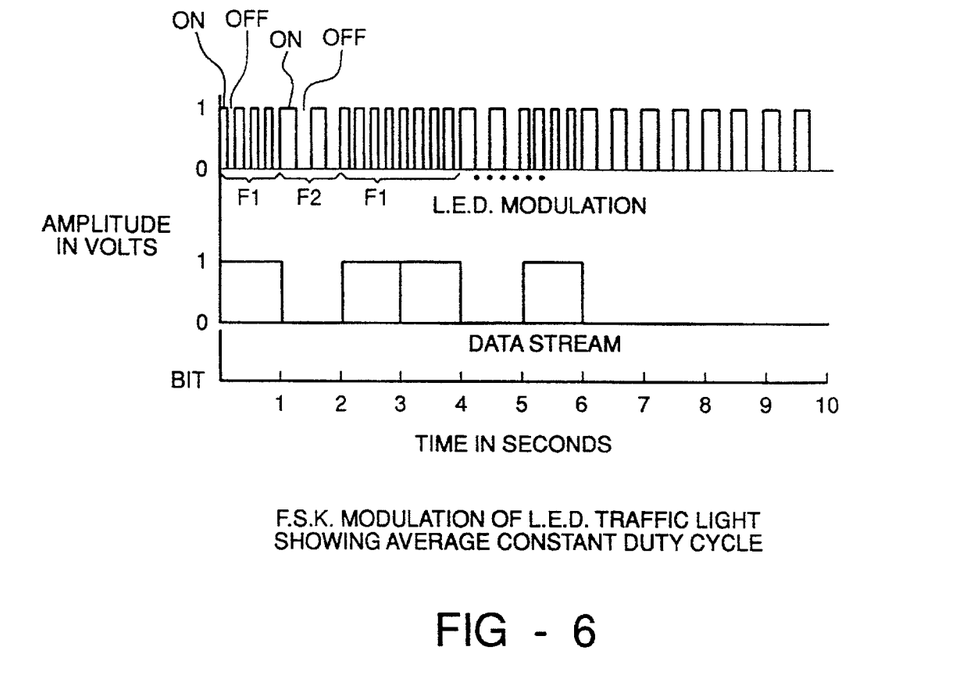
FIG. 6 is a signal diagram of amplitude versus time depicting one modulation scheme utilized in the present invention.

If an L.E.D. lamp is required to maintain an essentially constant, perceived output, the modulation imparted to the L.E.D. must be sufficiently fast and exhibit a constant average duty cycle. Several digital modulation schemes are capable of this limitation. Pulse position modulation (PPM), phase shift keyed (PSK) modulation and frequency shift modulation (FSK) are typical forms of an essentially constant duty cycle modulation. The F.S.K. modulation scheme is shown in FIG. 6, as it is among the simplest to implement, and it is widely employed in wired and wireless communication links. Two distinct frequencies F1 and F2 are used to signal the digital 1's and 0's or mark and space data that constitute the message or data to be transmitted. The advantage of using such a digital modulation scheme is that the average L.E.D. lamp current (and power) remains essentially constant irrespective of the data. The reason for this is readily apparent in the diagram depicted in FIG. 6 which indicates a constant 50% duty cycle for any data stream. The result of such modulation is that the visible (perceived) brightness of the lamp is invariant, while high rate digital data is being transmitted or even when no data is transmitted (all 1's or 0's). Ideally, the F.S.K. frequencies F1 and F2 representing the digital 1's or 0's would be separated by several hundred Hertz or kilo Hertz to facilitate unambiguous detection. Having the frequencies within a 10% band would allow a single tuned input amplifier to act as preselector filter to the frequency detectors. Operating the L.E.D. lamps in the 30 to 90 Khz range may be advantageous. This frequency band permits easy differentiation from high intensity discharge (H.I.D.) lamps such as street lights or neon lights. These light sources may have similar spectral characteristics as the traffic lamps, and thereby interfere with reliable detection of the traffic lights 18. Naturally, simple linear frequency modulation (f.m.) of the pulses is also possible, and low cost optical f.m. receivers could be used to listen to the real time audio message.

Figure 5:
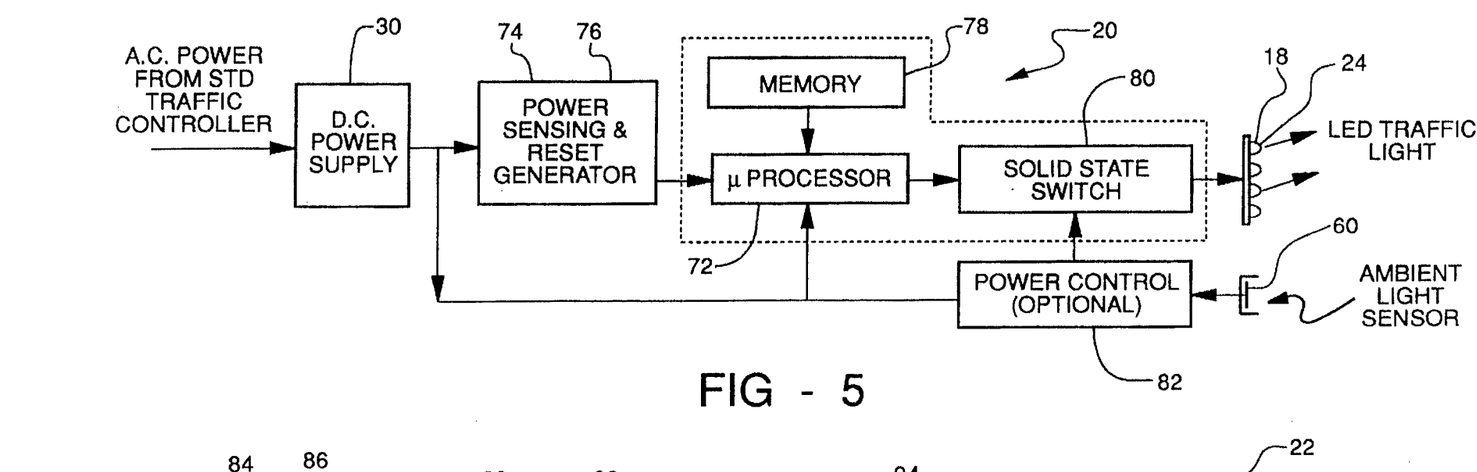
FIG. 5 is a schematic block diagram of additional circuitry utilized in the present invention.

Referring to FIG. 5, the transmitter 20 that modulates the traffic light 18 is powered by the d.c. power supply means 30. The a.c. power from a conventional traffic light controller in turn powers the d.c. power supply means 30. The transmitter 20 comprises a non-volatile local memory (EEPROM) or one time programmable (O.T.P.) memory chip 78 for electronically storing the digital message to be transmitted. The message itself could be coded in virtually any form such as ASCII or a proprietary alphanumeric code. Additionally, digitally coded, compressed voice communication could be transmitted along with the alphanumeric text, or instead of it, to facilitate the regeneration of high quality voice messages at the remote receiver 22. The transmitter 20 further comprises a microprocessor 72 for controlling the removal of the digital message stored in the memory chip 78. The microprocessor 72 also controls the transmission of the digital message.

The transmitter 20 further includes a solid state switch 80. The solid state switch 80 converts the coded digital message developed by the microprocessor 72 into F.S.K. format and thereafter transfers the F.S.K. modulated signal to the diodes 24 of the traffic light 18. In other words, the switch 80 controls the power from the d.c. power supply means 30 to supply power to illuminate the diodes 24 at a predetermined frequency having a duty cycle consisting of an ON period followed by an OFF period short enough to be humanly imperceivable. The microprocessor 72 further includes modulator means for varying the frequency of the ON and OFF periods to transmit the information. Microprocessor 72 also includes signal processor means for maintaining a constant duty cycle ratio of the ON period to OFF period and average L.E.D. power as the frequency of the ON and OFF periods vary. Signal processor means includes means for establishing a first frequency F1 to create a first digital signal corresponding to a digital "1" and for establishing a second frequency F2 to create a second digital signal corresponding to a digital "0".

The traffic light assembly 16 may include power sensing means 74 for sensing when d.c. power is delivered from the d.c. power supply means 30 and a reset generator 76 for resetting the microprocessor 72 each time d.c. power is delivered to the traffic light 18 to initiate a new digital message sequence. The traffic light assembly 16 may also include ambient light sensor means 60 for varying the luminosity of the diodes 24 in response to ambient light variations. Ambient light sensor means 60 includes a photodetector 60 coupled to a power control element 82. Power control element 82 controls the quantity of power delivered to the diodes 24 in response to the level of ambient light detected by the photodetector 60. For example, at night, the voltage of the pulses delivered to the traffic light 18 may be reduced to decrease brightness to further reduce power consumption while in bright sunlight the sensor means 60 would cause the power control element 82 to increase the voltage of pulses delivered to the traffic light 18. The power control element 82 could consist of a linear voltage regulator, or a low loss high frequency pulse width modulation (P.W.M.) controller, both of which are commercially available devices. Note that if pulse control is utilized to control lamp brightness, the operating frequency of such a device would have to be significantly greater than the modulation frequency in order to not affect the digital coding.

Figure 7:
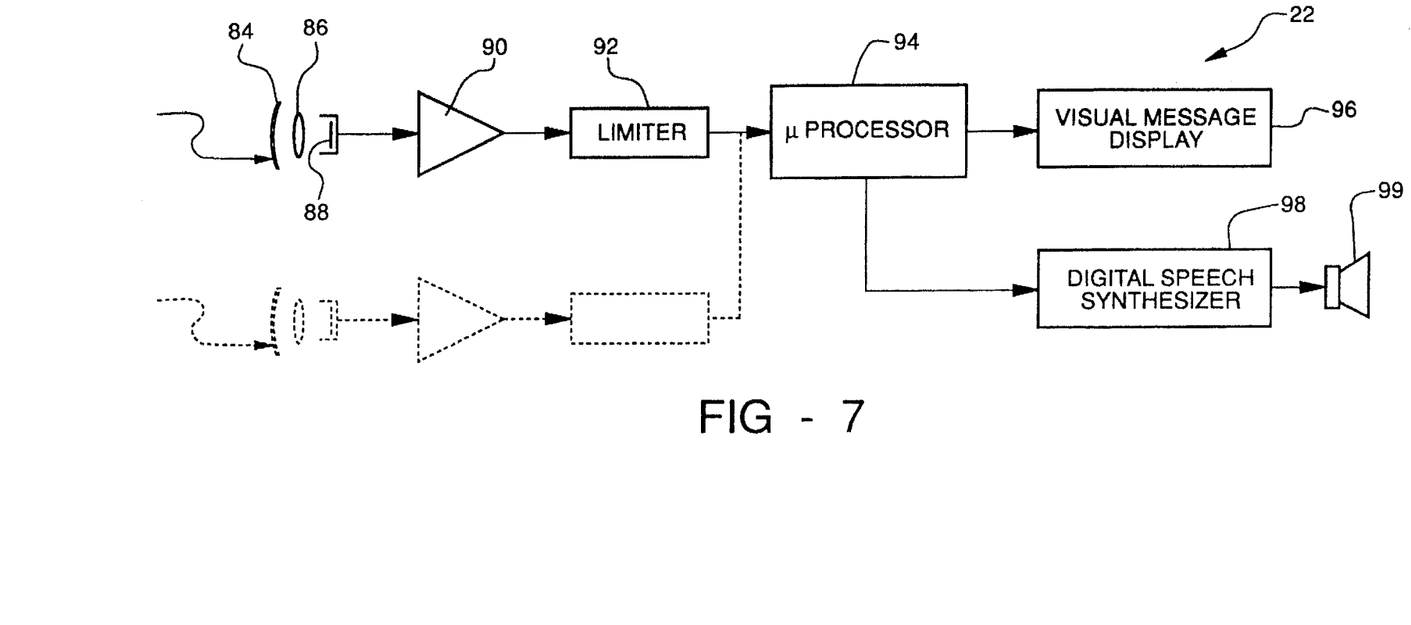
FIG. 7 is a schematic block diagram of the receiver of the present invention.

The companion receiver 22 receives the digital information transmitted by the diodes 24. Referring to FIG. 7, receiver 22 consists of an optical wavelength selective filter 84, a collection lens 86, and a receiver photodetector 88 coupled to a tuned amplifier 90 and a limiter 92. The photodetector 88 converts the light rays emitted by the diodes 24 into an output signal of electric current. The optical wavelength selective filter 84 allows only selective wavelengths of light, such as from green, yellow or red L.E.D.'s, to reach the photo detector 88. The collection lens 86 directs the light rays emitted by the diodes 24 to the photodetector 88. The amplifier 90 amplifies the output signal. The amplifier 90 is typically peaked to respond preferentially to the F.S.K. frequencies employed by the transmitter 20. F.S.K. detection may be advantageously provided by a receiver microprocessor 94 which then also handles character decoding (using nonvolatile resident memory) and the message display functions. The receiver 22 further comprises visual message display means 96 for visually displaying the digital information transmitted by the diodes 24. Typically, a liquid crystal, vacuum fluorescent, L.E.D., or miniature C.R.T. display would be used to display the message transmitted by the traffic light 18. The receiver 22 may also be equipped with a voice generation means 98 comprising a speaker means 99 for audibly conveying the digital information transmitted by the diodes 24. For voice message applications, dedicated voice synthesis integrated circuits would convert the digitized, transmitted voice announcement back into human speech for review by the driver. Modern linear predictive coding techniques and specialized voice I.C.'s (as used in many toys) could be used to simplify the delivery of audible messages of several seconds duration.

Figure 8:
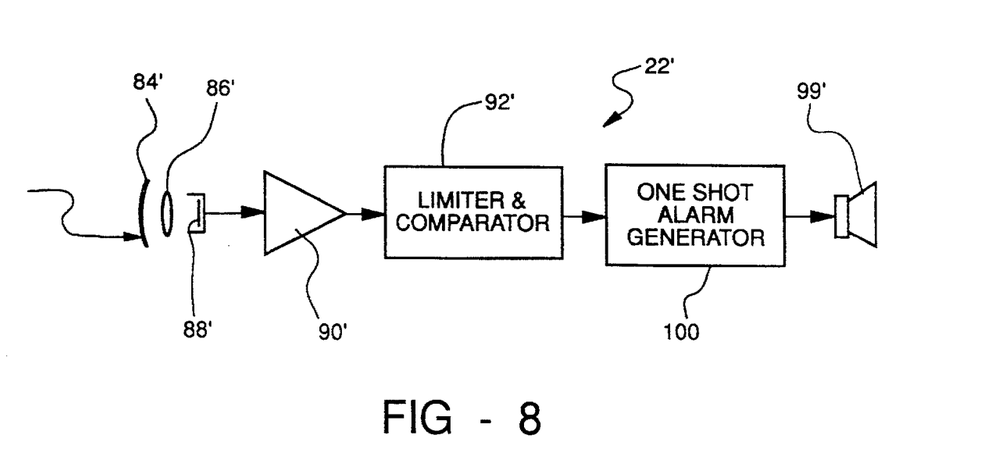
FIG. 8 is a schematic block diagram of the simplified receiver of the present invention.

Referring to FIG. 8, a simplified alternate receiver 22' is disclosed for use in detecting whether the red 17, yellow 19, or green 21 traffic light is illuminated. Receiver 22' consists of an optical wavelength selective filter 84', a collection lens 86', and receiver photodetector 88' coupled to a tuned amplifier 90' and a limiter 92'. The receiver 22' further includes an alarm generator 100 for driving a speaker 99'. As an example, the receiver 22' could be set up to sound an alarm upon the detection of a red light as transmitted by the first set of diodes 17A.

Once the requisite hardware is installed in a critical number of traffic lights 18 and vehicles 14, the traffic control system 10 may be used to transmit traffic advisory messages. That is, the system 10 need not be limited to repetitive prerecorded messages. A traffic light 18 positioned at specific points along a road 12, such as an intersection, may be directly accessed by cable or a wireless link from a central traffic authority to transmit messages to passing motorists. One method to accomplish such a function would be to download digital message data to selected traffic lights 18 for subsequent relay to passing vehicles 12. Time-out or "sunset" provisions in the software or traffic light transmitter 20 hardware could be implemented to erase messages that were no longer pertinent.

Another use for the traffic information system 10 described herein involves the use of the digitally coded traffic lights 18 as "signposts" for vehicular navigation systems. Digitally modulated traffic lights 18 could serve as convenient, low cost sign posts for vehicular navigation systems, where unambiguous location is essential. Traffic lights are ubiquitous, and are easily adapted to transmit digital location information as well as other data.

The invention has been described in an illustrative manner, and it is to be understood that the terminology which has been used is intended to be in the nature of words of description rather than of limitation.

Obviously, many variations and modifications are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A traffic information system (10) for providing a visual signal in the form of light rays and for using the light rays to transmit information to a remotely located target (14), said system (10) comprising:

traffic light means (18) comprising a plurality of light emitting diodes (24) for projecting light rays optically perceptible to humans;

power means for supplying power to illuminate said diodes (24) at a predetermined frequency having a duty cycle consisting of an ON period followed by an OFF period short enough to be humanly imperceivable whereby the light appears to be constantly illuminated to the human eye; and modulator means for varying said predetermined frequency of said ON and OFF periods to transmit information with light which appears to be uninterrupted to the human eye.

2. The system (10) of claim 1 wherein said modulator means includes signal processor means for maintaining a constant duty cycle ratio between said ON and OFF periods as the frequency of said ON and OFF periods vary.

3. The system (10) of claim 2 wherein said signal processor means includes means for establishing a first frequency for said ON and OFF periods to create a first digital signal and for establishing a second frequency for said ON and OFF periods to create a second digital signal.

4. The system (10) of claim 1 wherein said traffic light means (18) further includes red light means (17) comprising a first set of light emitting diodes (17A) for projecting red light rays.

5. The system (10) of claim 4 wherein said traffic light means (18) further includes yellow light means (19) comprising a second set of light emitting diodes (19A) for projecting yellow light rays.

6. The system (10) of claim 5 wherein said traffic light means (18) further includes green light means (21) comprising a third set of light emitting diodes (21A) for projecting green light rays.

7. The system (10) of claim 1 further including d.c. power connection means (26) secured to said traffic light means (18) and electrically coupled to said diodes (24) for receiving d.c. power.

8. The system (10) of claim 7 further including a battery (32) removably connected to said traffic light means (18) for supplying d.c. power to said d.c. power connection means (26) to illuminate said diodes (24).

9. The system (10) of claim 7 further including a.c. power connection means (28) secured to said traffic light means (18) for receiving a.c. power.

10. The system (10) of claim 9 further including d.c. power supply means (30) electrically coupled to and between said a.c. power connection means (28) and said d.c. power connection means (26) for converting a.c. power received by said a.c. power connection means (28) to d.c. power so that d.c. power is supplied to said d.c. power connection means (26).

11. The system (10) of claim 1 wherein said traffic light means (18) further includes circuit board means (44) for electrically coupling said diodes (24).

12. The system (10) of claim 11 wherein said circuit board means (44) includes connection means for electrically coupling said diodes (24) in a plurality of series circuits (46) and for electrically coupling said series circuits (46) in parallel.

13. The system (10) of claim 11 wherein said series circuits (46) each include an equal number of light emitting diodes (24).

14. The system (10) of claim 11 wherein said traffic light means (18) further comprises a light housing (48).

15. The system (10) of claim 14 wherein said light housing (48) comprises a hollow member (50) having a front open end (52) and a rear open end (54).

16. The system (10) of claim 15 wherein said light housing (48) further comprises a front cover (56) for covering said front end (52) and a rear cover (58) for covering said rear end (54).

17. The system (10) of claim 16 wherein said diodes (24) are mounted within said hollow member (50) between said front (56) and rear (58) covers.

18. The system (10) of claim 16 wherein said front cover (56) comprises a transparent lens having a smooth outer surface (62).

19. The system (10) of claim 16 wherein said front (56) and rear (58) covers form a hermetic seal with said hollow member (50).

20. The system (10) of claim 1 further comprising an assembly housing (64) for housing said traffic light means (18).

21. The system (10) of claim 20 wherein said traffic light means (18) further includes mounting means (66) for removably mounting said traffic light means (18) to said assembly housing (64).

22. The system (10) of claim 1 further comprising memory means (78) for storing the information to be transmitted by said diodes (24).

23. The system (10) of claim 1 further comprising receiver means (22,22') for receiving the information transmitted by said diodes (24).

24. The system (10) of claim 23 wherein said receiver means (22) further comprises visual message display means (96) for visually displaying the information transmitted by said diodes (24).

25. The system (10) of claim 23 wherein said receiver means (22) further comprises voice generation means (98, 99) for audibly conveying the information transmitted by said diodes (24).

26. The system (10) of claim 23 wherein said receiver means (22,22') comprises photodetector means (88,88') for converting the light rays emitted by said diodes (24) into an output signal of electric current.

27. The system (10) of claim 26 wherein said receiver means (22,22') further comprises an optical wavelength selective filter means (84,84') for allowing only selective wavelengths of light to reach said photodetector means (88,88').

28. The system (10) of claim 27 wherein said receiver means (22,22') further comprises a collection lens means (86,86') for directing the light rays emitted by said diodes (24) to said photodetector means (88,88').

29. The system (10) of claim 28 wherein said receiver means (22,22') further comprises tuned amplifier means (90,90') for amplifying said output signal.

30. The system (10) of claim 29 wherein said receiver means (22) further comprises decoder means (94) for decoding the information from said output signal.

31. A traffic information system (10) for transmitting information to a remotely located target (14), said system (10) comprising:

traffic light means (16) for projecting light rays to a target (14), said traffic light means (16) including first light means (17) for projecting first light rays to the target (14) and second light means (19) for projecting second light rays to the target (14);

a transmitter (20) including means for illuminating said first light means (17) at a first frequency to transmit said first light rays from said first light means (17) at said first frequency and for illuminating said second light means (19) at a second frequency to transmit said second light rays from said second light means (19) at said second frequency;

a receiver (22,22') including photodetector means (88,88') for converting said first light rays into a first output signal of electric current having a first output frequency and for converting said second light rays into a second output signal of electric current having a second output frequency; and characterized by said receiver (22,22') further including differential means (92,92') for differentiating said first output frequency from said second output frequency to detect the presence of one of said first or second light rays.

32. The system (10) of claim 31 wherein said first light means (17) comprises a first set of light emitting diodes (17A).

33. The system (10) of claim 32 wherein said second light means (19) comprises a second set of light emitting diodes (19A).

34. The system (10) of claim 31 wherein said receiver (22) further includes means (96) for visually indicating detection of illumination from one said first (17) or second (19) light means.

35. The system (10) of claim 31 wherein said receiver (22,22') further includes means (98,99,100,99') for audibly indicating detection of illumination from said first (17) or second (19) light means.

36. A traffic light assembly (16) for transmitting information to a remotely located target (14), said assembly (16) comprising:

traffic light means (18) comprising a plurality of light emitting diodes (24) for transmitting light rays from said traffic light assembly (16);

d.c. power connection means (26) secured to said traffic light means (18) and electrically coupled to said diodes (24) for receiving d.c. power;

a.c. power connection means (28) secured to said traffic light means (18) for receiving a.c. power;

d.c. power supply means (30) secured to said traffic light means (18) and electrically coupled to and between said a.c. power connection means (28) and said d.c. power connection means (26) for converting a.c. power received by said a.c. power connection means (28) to d.c. power so that d.c. power is supplied to said d.c. power connection means (26); and characterized by a battery (32) removably connected to said traffic light means (18) for supplying d.c. power to said d.c. power connection means (26) to illuminate said diodes (24).

37. The traffic light assembly (16) of claim 36 further comprising a.c. power monitoring circuit means (34) secured to said traffic light means (18) for monitoring a.c. power supplied to said a.c. power connection means (28).

38. The traffic light assembly (16) of claim 37 further comprising switch means (36) secured to said traffic light means (18) for electrically coupling said battery (32) to said d.c. power connection means (26) in response to a trigger signal from said a.c. power monitoring means (34) prompted by a predetermined decrease in a.c. power supplied to said a.c. power connection means (28).

39. The traffic light assembly (16) of claim 38 further comprising pulsating circuit means (38) secured to said traffic light means (18) and electrically coupled to said switch means (36) for causing said switch means (36) to electrically couple said battery (32) to said d.c. power connection means (26) at a predetermined frequency to illuminate said diodes (24) at said predetermined frequency so as to minimize consumption of power from said battery (32).

40. The traffic light assembly (16) of claim 38 further comprising transmitter means (40) secured to said traffic light means (18) and electrically coupled to said switch means (36) for transmitting a radio wave in response to said trigger signal.

41. The traffic light assembly (16) of claim 40 further comprising delay means (42) secured to said traffic light means (18) and electrically coupled to said transmitter means (40) for delaying the transmission of said radio wave from said transmitter means (40) a predetermined time after said switch means (36) receives said trigger signal.

42. The traffic light assembly (16) of claim 36 further comprising battery charger means (33) secured to said traffic light means (18) and electrically coupled to and between said a.c. power connection means (28) and said d.c. power connection means (26) for recharging said battery (32).

43. The traffic light assembly (16) of claim 36 wherein said traffic light means (18) further comprises a circuit board means (44) for electrically coupling said diodes (24).

44. The traffic light assembly (16) of claim 43 wherein said circuit board means (44) includes connection means for electrically coupling said diodes (24) in a plurality of series circuits (46) and for electrically coupling said series circuits (46) in parallel.

45. The traffic light assembly (16) of claim 44 wherein said series circuits (46) each include an equal number of light emitting diodes (24).

46. The traffic light assembly (16) of claim 43 further comprising light ray steering means (68,70) operably associated with said circuit board means (44) for steering the light rays emitted by said diodes (24).

47. The traffic light assembly (16) of claim 46 wherein said light ray steering means (70) comprises a spacer member (70) positioned between said circuit board means (44) and said diodes (24).

48. The traffic light assembly (16) of claim 46 wherein said light ray steering means (68) comprises a refractive lens (68) positioned adjacent to said circuit board means (44) and said diodes (24).

49. The traffic light assembly (16) of claim 36 further comprising ambient light sensor means (60) for varying the intensity of said diodes (24) in response to ambient light variations.

50. The traffic light assembly (16) of claim 36 wherein said traffic light means (18) further comprises a light housing (48).

51. The traffic light assembly (16) of claim 50 wherein said light housing (48) comprises a hollow member (50) having a front open end (52) and a rear open end (54).

52. The traffic light assembly (16) of claim 51 wherein said light housing (48) further comprises a front cover (56)

for covering said front end (52) and a rear cover (58) for covering said rear end (54).

53. The traffic light assembly (16) of claim 52 wherein said diodes (24) are mounted within said hollow member (50) between said front and rear covers (56,58).

54. The traffic light assembly (16) of claim 52 wherein said front cover (56) comprises a transparent lens having a smooth outer surface (62).

55. The traffic light assembly (16) of claim 52 wherein said front and rear covers (56,58) form a hermetic seal with said hollow member (50).

56. The traffic light assembly (16) of claim 50 wherein said traffic light assembly (16) further comprises an assembly housing (64).

57. The traffic light assembly (16) of claim 56 wherein said light housing (48) further includes mounting means (66) for removably mounting said traffic light means (18) to said assembly housing (64).

58. A method for transmitting information from a traffic light assembly (16) of the type having a plurality of light emitting diodes (24) to a location remote from the traffic light assembly (16), said method comprising the steps of:
  illuminating the diodes (24) to produce light optically perceivable to humans;
  turning the diodes (24) ON and OFF at a predetermined frequency having a duty cycle consisting of an ON period followed by an OFF period short enough to be humanly imperceivable whereby the light appears constantly illuminated to the human eye; and
  varying the frequency of the ON and OFF periods to transmit the information with light which appears to be uninterrupted to the human eye.

59. The method as set forth in claim 58 further including the step of:
  maintaining a constant ratio between the ON and OFF periods as the frequency of the ON and OFF periods vary.

60. The method as set forth in claim 59 further including the step of:
  varying the frequency of the ON and OFF periods between a first frequency to create a first digital signal and a second frequency to create a second digital signal.

61. The method as set forth in claim 60 further including the step of:
  collecting the illumination cast by the diodes (24) at the remote location.

62. The method as set forth in claim 61 further including the step of:
  converting the illumination cast by said diodes (24) into an output signal of electric current.

63. The method as set forth in claim 62 further including the step of:
  differentiating between the first digital signal and the second digital signal from the output signal to determine the digital information transmitted by the diodes (24).

64. A method for optically transmitting data from a traffic light assembly (16) to a receiver (22,22') disposed on a target (14) wherein the traffic light (18) is of the type for controlling the movement of the target (14) and is of the type including a first light (17) for projecting first light rays to the target (14) and a second light (19) for projecting second light rays to the target (14); said method comprising the steps of:
  illuminating the first light (17) at a first frequency to transmit the first light rays from the first light (17) at the first frequency;
  illuminating the second light (19) at a second frequency to transmit the second light rays from the second light (19) at the second frequency;
  converting the first light rays into a first output signal of electric current having a first output frequency;
  converting the second light rays into a second output signal of electric current having a second output frequency; and
  differentiating the first output frequency from the second output frequency to detect the presence of either the first or second light rays.

65. A traffic system (10) for optically transmitting information from a traffic light (18) to a vehicle (14), said system (10) comprising:
  a road (12);
  a vehicle (14) traveling on said road (12);
  a traffic light (18) operatively associated with said road (12), said traffic light (18) comprising at least one lamp means (24) for providing an illuminated signal optically perceivable to the human eye;
  transmitter means (20) for transmitting information from said traffic light (18) by turning said lamp means (24) ON and OFF at a predetermined frequency having a duty cycle consisting of an ON period followed by an OFF period short enough to be humanly imperceivable whereby the light appears constantly illuminated to the human eye; and
  receiver means (22,22') disposed on said vehicle (14) for optically receiving and decoding the information transmitted by said ON and OFF periods by an illuminated signal which appears to be uninterrupted to the human eye.

66. The system (10) of claim 65 further comprising modulator means (72) for varying the frequency of said ON and OFF periods to transmit information.

67. The system (10) of claim 66 wherein said modulator means (72) includes signal processor means for maintaining a constant ratio between said ON and OFF periods as the frequency of said ON and OFF periods vary.

68. The system (10) of claim 67 wherein said signal processor means includes means for establishing a first frequency for said ON and OFF periods to create a first digital signal and for establishing a second frequency for said ON and OFF periods to create a second digital signal.

69. The system (10) of claim 68 further comprising a traffic control center remotely located from said traffic light (18).

70. The system (10) of claim 69 further comprising means for transmitting the data from said traffic control center to said traffic light (18).

71. The system (10) of claim 65 wherein said lamp means (24) comprises a plurality of light emitting diodes (24).

72. A traffic light assembly (16) for transmitting information and comprising:
  traffic light means (18) including a plurality of light emitting diodes (24) for transmitting light rays in the range clearly perceptible optically to the human eye at roadway distances in broad daylight; and
  power means for supplying power to illuminate said diodes (24) at a predetermined frequency having a duty cycle consisting of an ON period followed by an OFF period short enough to be optically imperceivable to the human eye so that the light appears to be constantly illuminated to the human eye while in operation whereby the illumination of said diodes is viewed at a traffic distance by the human eye as a traffic signal and a receiver decodes the ON and OFF periods which are imperceivable to the human and produces an independent information signal.

73. A method for transmitting information from a traffic assembly comprising the steps of:

illuminating a plurality of diodes to produce light rays in the range clearly perceptible optically to the human eye at roadway distances in broad daylight;

turning the diodes ON and OFF at a predetermined frequency having a duty cycle consisting of an ON period followed by an OFF period short enough to be optically imperceivable to the human eye so that the light appears to be constantly illuminated to the human eye while in operation;

viewing the light at a traffic distance in the range optically perceivable by the human eye as a traffic signal;

decoding the humanly imperceivable ON and OFF periods with a photo detector; and producing an independent information signal in response to the decoding.

* * * * *